United States Patent
Jang et al.

(10) Patent No.: US 10,880,534 B2
(45) Date of Patent: Dec. 29, 2020

(54) ELECTRONIC DEVICE AND METHOD FOR TILED VIDEO MULTI-CHANNEL PLAYBACK

(71) Applicant: KOREA ELECTRONICS TECHNOLOGY INSTITUTE, Seongnam-si (KR)

(72) Inventors: Junhwan Jang, Goyang-si (KR); Woochool Park, Incheon (KR); Youngwha Kim, Seoul (KR); Jinwook Yang, Goyang-si (KR); Sangpil Yoon, Seoul (KR); Hyunwook Kim, Goyang-si (KR); Eunkyung Cho, Gyeonggi-do (KR); Minsu Choi, Seoul (KR); Junsuk Lee, Seoul (KR); Jaeyoung Yang, Seoul (KR)

(73) Assignee: KOREA ELECTRONICS TECHNOLOGY INSTITUTE, Seongnam-si (KR)

(*) Notice: Subject to any disclaimer, the term of this patent is extended or adjusted under 35 U.S.C. 154(b) by 0 days.

(21) Appl. No.: 16/714,202

(22) Filed: Dec. 13, 2019

(65) Prior Publication Data
US 2020/0154092 A1    May 14, 2020

Related U.S. Application Data

(63) Continuation of application No. PCT/KR2018/014573, filed on Nov. 23, 2018.

(30) Foreign Application Priority Data

Nov. 9, 2018    (KR) .................. 10-2018-0137672

(51) Int. Cl.
*H04N 7/18*       (2006.01)
*H04N 13/117*    (2018.01)
(Continued)

(52) U.S. Cl.
CPC ......... *H04N 13/117* (2018.05); *H04L 65/601* (2013.01); *H04L 65/607* (2013.01);
(Continued)

(58) Field of Classification Search
CPC .. H04N 13/117; H04N 13/156; H04N 13/161; H04N 13/194; H04N 2013/0074;
(Continued)

(56) References Cited

U.S. PATENT DOCUMENTS

2011/0157169 A1* 6/2011 Bennett ................. H04N 13/00
                                                                345/419
2018/0160160 A1* 6/2018 Swaminathan .... H04N 21/8456

FOREIGN PATENT DOCUMENTS

KR    10-2015-0065069 A    6/2015
KR    10-2015-0093507 A    8/2015
(Continued)

OTHER PUBLICATIONS

International Search Report of corresponding PCT Application No. PCT/KR2018/014573—3 pages (dated Aug. 6, 2019).

*Primary Examiner* — Shan E Elahi
(74) *Attorney, Agent, or Firm* — Knobbe Martens Olson & Bear LLP

(57) ABSTRACT

An electronic device and a method for a tiled video multi-channel playback are disclosed. The electronic device includes a device communication unit and a device controller. The device communication unit establishes a communication channel with a streaming server. The device controller can detect a region of interest (ROI) of an image related to a media presentation description (MPD) tile provided by the streaming server, transmit ROI information to the streaming server and receive tiles of a tiled video having a first resolution and corresponding to the ROI information, a full video having a second resolution lower
(Continued)

than the first resolution, and a plurality of 2D videos from the streaming server. The device controller can also generate a 360-degree VR video by synthesizing the video tiles and the full video, and control a simultaneous playback of the generated 360-degree VR video and the plurality of 2D videos.

10 Claims, 4 Drawing Sheets

(51) Int. Cl.
  *H04N 13/156* (2018.01)
  *H04L 29/06* (2006.01)
  *H04N 13/161* (2018.01)
  *H04N 13/194* (2018.01)

(52) U.S. Cl.
  CPC ......... *H04N 13/156* (2018.05); *H04N 13/161* (2018.05); *H04N 13/194* (2018.05)

(58) Field of Classification Search
  CPC .......... H04N 2013/0092; H04N 13/344; H04L 65/607; H04L 65/601; H04L 65/602; H04L 65/4092; H04L 65/80; H04L 65/4084
  USPC .......................................................... 348/43
  See application file for complete search history.

(56) References Cited

FOREIGN PATENT DOCUMENTS

| KR | 10-2016-0100705 A | 8/2016 |
| KR | 10-2016-0125708 A | 11/2016 |
| KR | 10-2018-0052255 A | 5/2018 |

\* cited by examiner

ELECTRONIC DEVICE AND METHOD FOR TILED VIDEO MULTI-CHANNEL PLAYBACK

CROSS REFERENCE TO RELATED APPLICATIONS

This is a continuation application of International Patent Application No. PCT/KR2018/014573, filed on Nov. 23, 2018, which claims priority to Korean patent application No, 10-2018-0137672 filed on Nov. 9, 2018, contents of both of which are incorporated herein by reference in their entireties.

BACKGROUND

Technical Field

The present disclosure generally relates to a multi-Channel playback technology and, more particularly, to an electronic device and method for a tiled video multi-channel playback that allows a simultaneous playback of a high-quality 360-degree VR video and a plurality of 2D videos.

Description of Related Technology

With the growths of Internet related technologies, it is possible to transfer a high-quality large-sized media file. However, even up to now, the quality of service (QoS) of the Internet is not guaranteed for a large-sized media content streaming service. Further, due to the limitation of bandwidth, it is difficult to provide a seamless streaming service to consumers. In order to solve this issue, it was required to develop a streaming technology to adapt to network environments, and thus standardization was made in the name of dynamic adaptive streaming over HTTP (DASH) by the international standardization organization motion picture expert group (MPEG).

SUMMARY

As the tendency for consumers of a streaming service to desire to receive various types of videos at the same time increases, researches for reflecting such demands are being conducted.

An aspect of the present disclosure is to provide an electronic device and method for a tiled video multi-channel playback that allows it simultaneous playback of a high-quality 360-degree VR video and a plurality of 2D videos.

Embodiments of the present invention provide an electronic device for a tiled video multi-channel playback that includes a device communication unit establishing a communication channel with a streaming server, and a device controller configured to detect a region of interest (ROI) of an image related to a media presentation description (MPD) file provided by the streaming server, to transmit ROI information to the streaming server, to receive tiles of a tiled video having a first resolution and corresponding to the ROI information, a full video having a second resolution lower than the first resolution, and a plurality of 2D videos from the streaming server, to generate a 360-degree VR video by synthesizing the video tiles and the full video, and to control a simultaneous playback of the generated 360-degree VR video and the plurality of 2D videos.

In addition, the device controller is further configured to distinguish a main object and a background object by using data parsed from the MPD file, and to detect a region of the main object as the ROI.

In addition, the electronic device further includes a sensor unit for sensing a user's viewpoint looking at the MPD file, and the device controller is further configured to detect, as the ROI, a region corresponding to the user's viewpoint sensed by the sensor unit.

In addition, the device controller is further configured to control the simultaneous playback of the 360-degree VR video and the plurality of 2D videos by using two decoders.

In addition, the device controller is further configured to control one of the two decoders to decode the 360-degree VR video, and to control the other decoder to decode the plurality of 2D videos and audio information.

In addition, the device controller is further configured to perform rendering such that the 360-degree VR video is disposed in an entire screen and the plurality of 2D videos are disposed in non-ROIs of the 360-degree VR video.

In addition, the device controller is further configured to perform the rendering in a stereo format.

Embodiments of the present invention provide a method for a tiled video multi-channel playback that includes, at an electronic device, receiving a media presentation description (MPD) file from a streaming server; at the electronic device, detecting a region of interest (ROI) of an image related to the MPD file; at the electronic device, transmitting ROI information to the streaming server; at the electronic device, receiving tiles of a tiled video having a first resolution and corresponding to the ROI information, a full video having a second resolution lower than the first resolution, and a plurality of 2D videos from the streaming server, at the electronic device, generating a 360-degree VR video by synthesizing the video tiles and the hill video; and at the electronic device, performing a simultaneous playback of the generated 360-degree VR video and the plurality of 2D videos.

In addition, the simultaneous playback of the 360-degree VR video and the plurality of 2D videos is performed by using two decoders.

In addition, the simultaneous playback includes rendering performed such that the 360-degree VR video is disposed in an entire screen and the plurality of 2D videos are disposed in non-ROIs of the 360-degree VR video.

The electronic device and method for the tiled video multi-channel playback according to embodiments of the present invention can enable a simultaneous playback of a high-quality 360-degree VR video and a plurality of 2D videos through two decoding modules.

Thus, embodiments of the present invention can provide a user with the high-quality 360-degree VR video and the plurality of 2D videos at the same time with a low delay or seamlessly.

DETAILED DESCRIPTION

Figure 1:
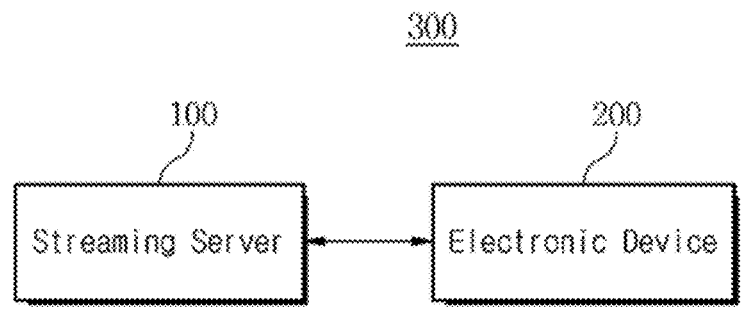
FIG. 1 is a schematic diagram illustrating a streaming service system according to an embodiment of the present invention.

Hereinafter, embodiments of the present invention will be described in detail with reference to the accompanying drawings. In the drawings and descriptions, the same or corresponding elements are denoted by the same reference numerals. Also, in describing features of the present invention, techniques that are well known in the art will not be described. This is to avoid obscuring a subject matter of embodiments of the present invention by omitting an unnecessary explanation.

FIG. 1 is a schematic diagram illustrating a streaming service system according to an embodiment of the present invention.

Referring to FIG. 1, the streaming service system 300 simultaneously plays back and provides a high-quality 360-degree VR video and a plurality of 2D videos to a user. The streaming service system 300 includes a streaming server 100 and an electronic device 200.

The streaming server 100 generates a media presentation description (MPD) the for tiles of a tiled video and transmits the generated MPD file to the electronic device 200. The streaming server 100 generates, using region of interesting (ROI) information, tiles of a tiled video having a first resolution and corresponding to the ROI information, and a full video having a second resolution lower than the first resolution. The streaming server 100 transmits, to the electronic device 200, the generated tiles of the tiled video, the generated full video, and a plurality of 2D videos. The streaming server 100 may further transmit audio information to the electronic device 200. The MPD file may correspond to a manifest file that contains information about contents available for the electronic device 200, provided alternative bit rates, and URL address values. The ROI may be generated based on field of view (FOV) information of a user. The streaming server 100 may be implemented as a desktop, a laptop, a server computer, a cluster computer, or the like.

By parsing the MPD file, the electronic device 200 may acquire information about program timing, media-content availability, media type, image quality, minimum and maximum bandwidths, usable encoded-alternatives, DRM, and the like. The electronic device 200 may select an encoding scheme corresponding to a network state or the status of the electronic device and then perform a streaming request through an HTTP GET Request. For example, the electronic device 200 may establish a communication channel with the streaming server 100 in response to a user input. Through this, the electronic device 200 transmits the ROI information to the streaming server 100 and receives the tiles of the tiled video, generated by using the ROI information, the full video, and the plurality of 2D videos.

The electronic device 200 generates a 360-degree VR video by synthesizing the received video tiles and the received full video, and simultaneously plays back a combination of the generated 360-degree VR video and the plurality of 2D videos. The electronic device 200 may further receive audio information from the streaming server 100 and reproduce the received audio information together with the 360-degree VR video and the plurality of 2D videos. The electronic device 200 may be implemented as a desktop, a laptop, a smart phone, a tablet PC, a handheld PC, an HMD, or the like, and preferably, the HMD.

Figure 2:
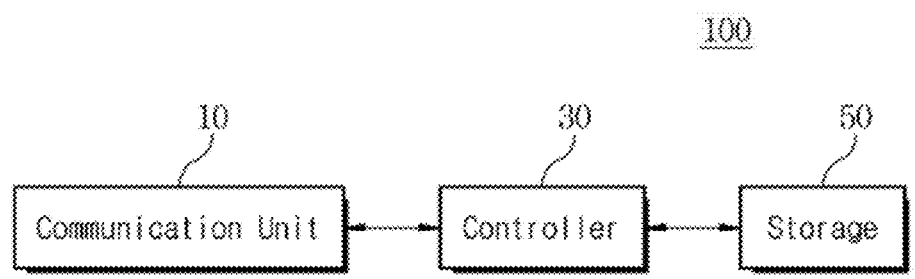
FIG. 2 is a block diagram illustrating a streaming server according to an embodiment of the present invention.

FIG. 2 is a block diagram illustrating a streaming server according to an embodiment of the present invention.

Referring to FIG. 2, the streaming server 100 may include a communication unit 10, a controller 30, and a storage 50.

The communication unit 10 communicates with the electronic device 200. The communication unit 10 may perform wired or wireless communication with the electronic device 200. The communication unit 10 receives a request signal for the MPD file regarding tiles of a tiled video, the ROI information, and a request signal for the tiled video and 2D videos from the electronic device 200. The communication unit 10 transmits the MPD the tile video, and the 2D videos corresponding to the request signals to the electronic device 200.

The controller 30 may control processing of instructions related to the operation of the streaming server 100 and storing management and transmission of data. The controller 30 may be implemented by at least one processor or may be implemented by at least one software module and operated by a designated processor.

The controller 30 may generate the MPD file for the video tiles and transmit the generated MPD file to the electronic device 200. When the ROI information is received, the controller 30 determines which video tile will be transmitted with a high resolution. That is, the controller 30 may control a video tile corresponding to the ROI information to be transmitted with a high resolution and also control a video tile not corresponding to the ROI information to be transmitted with a low resolution, thereby reducing a system load.

The controller 30 generates tiles of a tiled video having a first resolution and corresponding to the ROI information, and a full video having a second resolution lower than the first resolution, and controls the generated tiles and full video to be transmitted to the electronic device 200. At this time, the controller 30 controls 2D videos and audio information to be further transmitted.

The storage 50 stores various programs or various instructions necessary for operating the streaming server 100. The storage 50 may store the MPD file, the ROI information, the video tiles with the first resolution, the full video with the second resolution, the 2D videos, and/or the audio information. The storage 50 may include at least one of a flash memory type storage, a hard disk type storage, a multimedia card micro type storage, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk.

Figure 3:
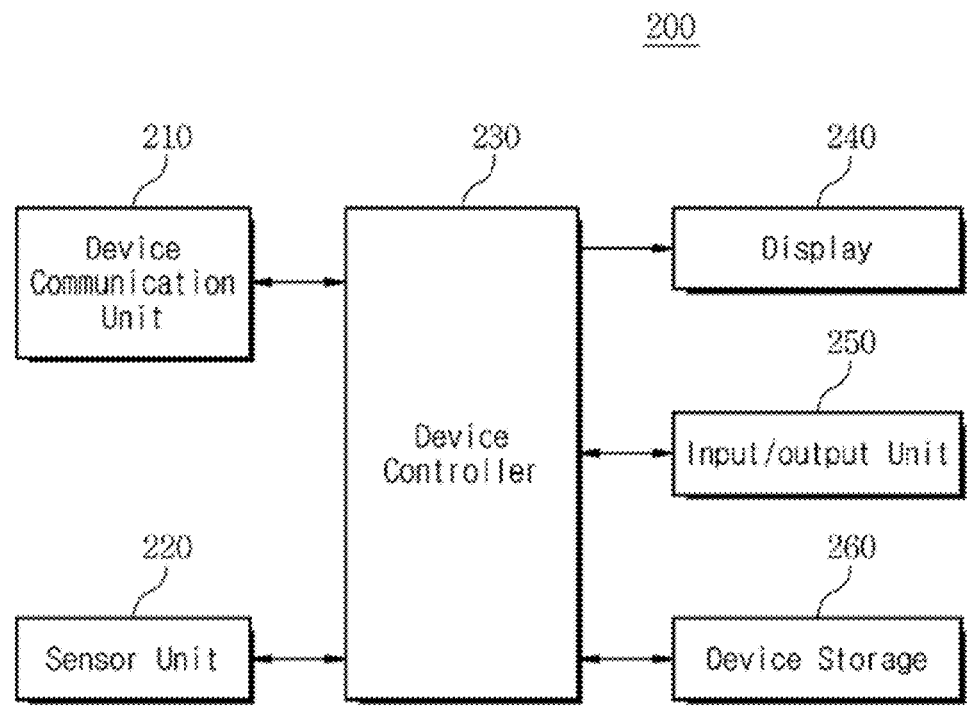
FIG. 3 is a block diagram illustrating an electronic device according to an embodiment of the present invention.

FIG. 3 is a block diagram illustrating an electronic device according to an embodiment of the present invention.

Referring to FIG. 3, the electronic device 200 includes a device communication unit 210, a sensor unit 220, a device controller 230, a display 240, an input/output unit 250, and a device storage 260.

The device communication unit 210 communicates with the streaming server 100. The device communication unit 210 may perform wired or wireless communication with the streaming server 100. The device communication unit 210 transmits, to the streaming server 100, a request signal for the MPD file, the ROI information, and a request signal for the tiled video and 2D videos. The device communication unit 210 receives, from the streaming server 100, the MPD file, the tiled video, and the 2D videos, which correspond to the request signals. Also, the device communication unit 210 may further receive audio information from the streaming server 100.

The sensor unit 220 tracks user's eyes and collects tracking information. The sensor unit 220 transmits information about a direction indicated by a user's pupil to the device controller 230 as viewpoint information. When the electronic device 200 is the HMD, the sensor unit 220 is installed in the HMD and may be activated, when the user wears the HMD, to detect a change in the position of the user's pupil. When the electronic device 200 is not the HMD, the sensor unit 220 is implemented as a separate sensor module and may be activated, when the user enters a user input, to detect a change in the position of the user's pupil.

The device controller 230 controls the request signal for requesting the MPD file to be transmitted to the streaming server 100. When the MPD file corresponding to the request signal is received, the device controller 230 controls the MPD file to be outputted through the display 240. At this time, the sensor unit 220 may collect viewpoint information of the user who watches a displayed image. The device controller 230 generates the ROI information by using, the viewpoint information collected by the sensor unit 220 and controls the generated ROI information to be transmitted to the streaming server 100. Alternatively or additionally, the device controller 230 may distinguish a main object and a background object by using data parsed from the MPD file, generate the ROI information by detecting a region of the main object as the ROI, and control the generated ROI information to be transmitted to the streaming server 100.

When receiving, from the streaming server 100, the tiles of the tiled video having the first resolution and corresponding to the ROI information, the full video having the second resolution lower than the first resolution, and the plurality of 2D videos, the device controller 230 performs rendering of the video tiles and the full video to generate a 360-degree VR video, and controls the display 240 to output the generated 360-degree VR video, in particular, the 360-degree VR video has a high resolution in the ROIs and a low resolution in the non-ROIs, thereby reducing the overall data load and enabling a low-latency live streaming service.

The device controller 230 controls the 360-degree VR video and the plurality of 2D videos to be simultaneously played by using two decoders. That is, the device controller 230 controls one of two decoders to decode the 360-degree VR video and also controls the other decoder to decode the plurality of 2D videos and audio information.

The device controller 230 generates a final video by rendering the decoded 360-degree VR video, the plurality of decoded 2D videos, and the decoded audio information. When performing the rendering to generate the final video, the 360-degree VR video is disposed in the entire screen, and the plurality of 2D videos are disposed in the non-ROIs of the 360-degree VR video. That is, the final video may refer to a video in Which the 360-degree VR video and the plurality of 2D videos are simultaneously outputted. The device controller 230 may perform the rendering in a stereo format.

The display 240 outputs a screen related to the operation of the electronic device 200. For example, the display 240 may output a screen associated with access to the streaming server 100, a screen associated with the MPD file provided by the streaming server 100, and the final video generated from the video tiles, the full video, and the 2D videos provided by the streaming server 100. When the electronic device 200 is the HMD, the display 240 may include separated display areas included in the HMD to output the VR video. The separated display areas may output a left-eye image and a right-eye image, respectively. The display 240 may include at least one of a liquid crystal display (LCD), a thin film transistor-liquid crystal display (TFT-LCD), an organic light emitting diode (OLED), a flexible display, or a three-dimensional (3D) display.

The input/output unit 250 may include at least one input device for entering a user input related to a manipulation of the electronic device 200, such as one or more buttons, a touch pad, a touch screen, and a voice input microphone. The input/output unit 250 may include an audio device capable of outputting an audio signal related to the operation of the electronic device 200, a lamp capable of outputting light, or a vibrating element.

The device storage 260 stores programs and instructions related to the operation of the electronic device 200. That is, the device storage 260 may store an application program associated with the operation of the electronic device 200. The device storage 260 may store the MPD file, the video tiles, the full video, and the audio information, which are received from the streaming server 100, and store the final video generated based on the ROI. The device storage 260 may include at least one of a flash memory type storage, a hard disk type storage, a multimedia card micro type storage, a card type memory (e.g., SD or XD memory), a RAM, an SRAM, a ROM, an EEPROM, a PROM, a magnetic memory, a magnetic disk, or an optical disk.

Figure 4:
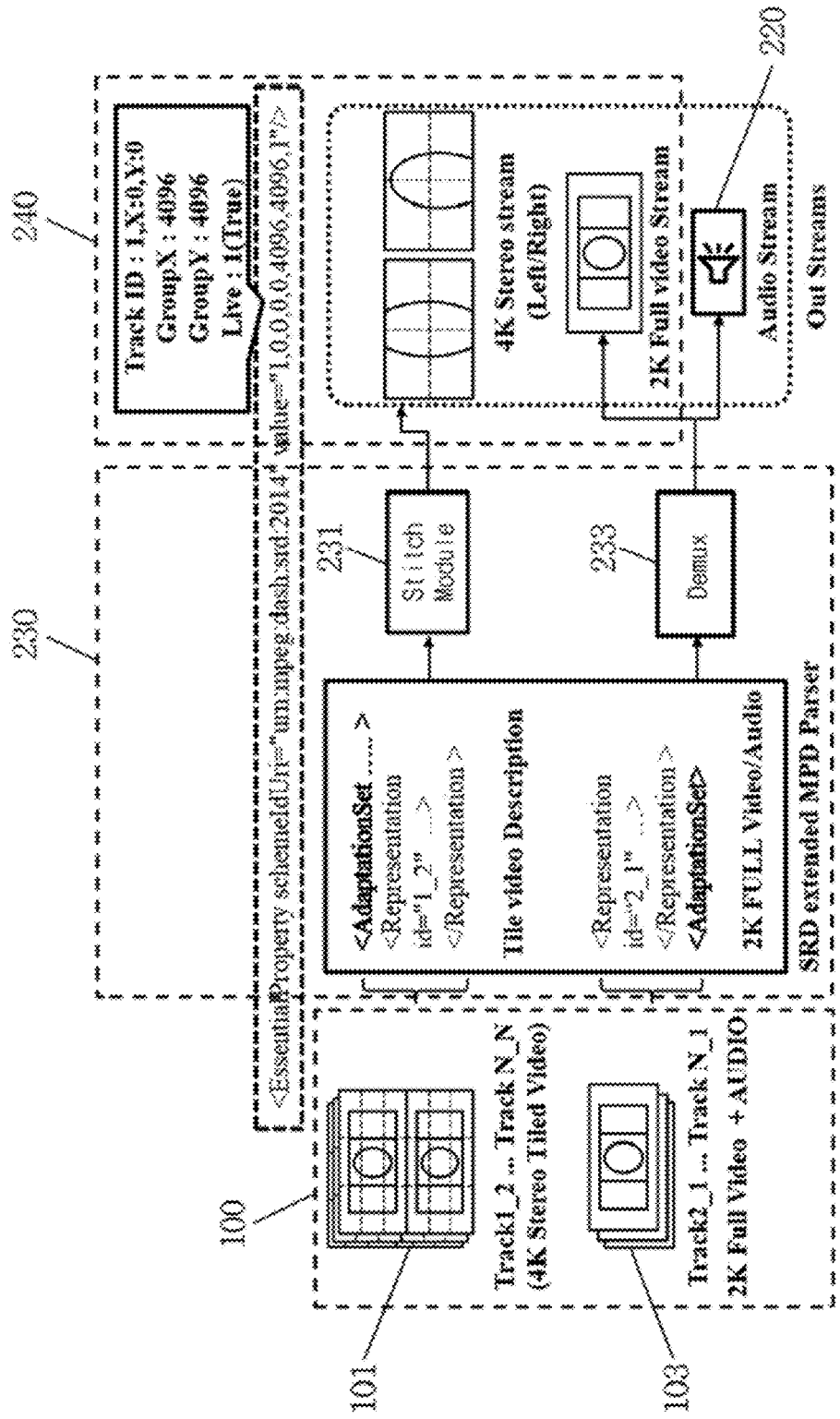
FIG. 4 is a diagram illustrating a tiled video multi-channel playback according to an embodiment of the present invention.
Figure 5:
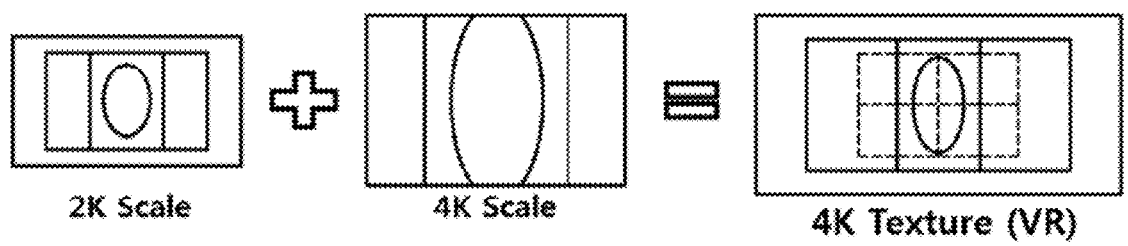
FIG. 5 is a diagram illustrating a tiled video rendering according to an embodiment of the present invention.
Figure 6:
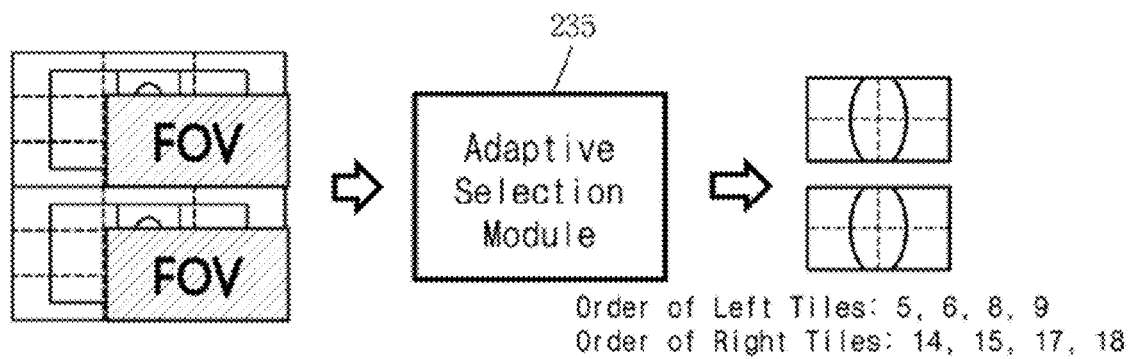
FIG. 6 is a diagram illustrating an adaptive selection module according to an embodiment of the present invention.
Figure 7:
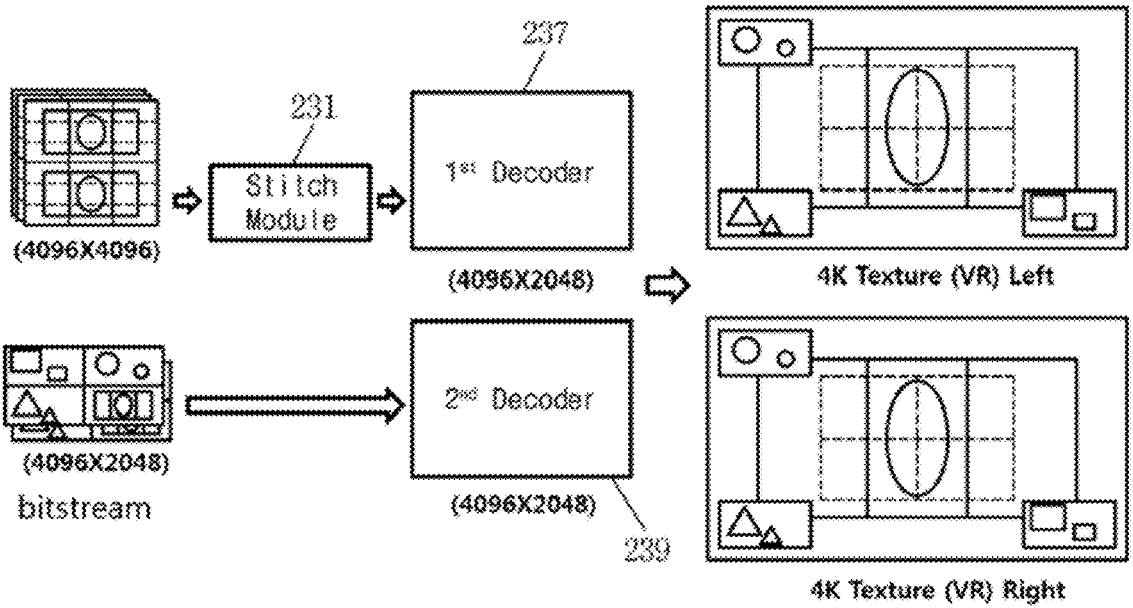
FIG. 7 is a diagram illustrating a multi-view playback according to an embodiment of the present invention.

FIG. 4 is a diagram illustrating a tiled video multi-channel playback according to an embodiment of the present invention. FIG. 5 is a diagram illustrating a tiled video rendering according to an embodiment of the present invention. FIG. 6 is a diagram illustrating an adaptive selection module according to an embodiment of the present invention. FIG. 7 is a diagram illustrating a multi-view playback according to an embodiment of the present invention.

Referring to FIGS. 1 and 3 to 7, the streaming service system 300 provides a user with a simultaneous playback of a 360-degree VR video and a plurality of 2D videos.

The streaming server 100 may store, in the storage 50, and manage video tiles 101 (e.g., 4K stereo video) having a first resolution, a full video 103 (e.g., 2K full video) having a second resolution (lower than the first resolution), and audio information.

The streaming server 100 receives ROI information from the electronic device 200 and also transmits, to the electronic device 200, the video tiles having the first resolution and corresponding to the ROI information, the frill video having the second resolution and corresponding to a background, and the audio information. In addition, the streaming server 100 may transmit a plurality of 2D videos to the electronic device 200.

The electronic device 200 controls, through the device controller 230, the 360-degree VR video and the plurality of 2D videos to be simultaneously played. That is, the device controller 230 may deliver the video tiles 101 of the first resolution (e.g., a tiled video received on the basis of MPEG-DAS-SRD) to the stitch module 231, and deliver the full video 103 of the second resolution and the audio information to the demux (or demultiplexer) 233. The stitch module 231 may generate one video corresponding to the ROI by stitching the received video tiles and store the generated video in the buffer of the display 240. The demux 233 may separate the full video and the audio information and deliver the audio information to an output device (e.g., a speaker) of the input/output unit 220. The separated full video having the second resolution may be stored in the butler of the display 240.

The device controller 230 generates, using the adaptive selection module 235, one 360-degree VR video from the one video corresponding to the ROI and the full video of the second resolution which are stored in the buffer of the display 240. The device controller 230 may decode the 360-degree VR video by using the first decoder 237, and decode the plurality of 2D videos by using the second decoder 239. The first decoder 237 and the second decoder 239 may perform decoding at the same time. Through this, the device controller 230 generates a final video in which the 360-degree VR video and the plurality of 2D videos are simultaneously played. Meanwhile, the device controller 230 may perform rendering such that the 360-degree VR video is disposed in the entire screen based on a stereo format and also the plurality of 2D videos are disposed in the non-ROIs of the 360-degree VR video. The plurality of 2D videos may be, but not limited to, three.

Figure 8:
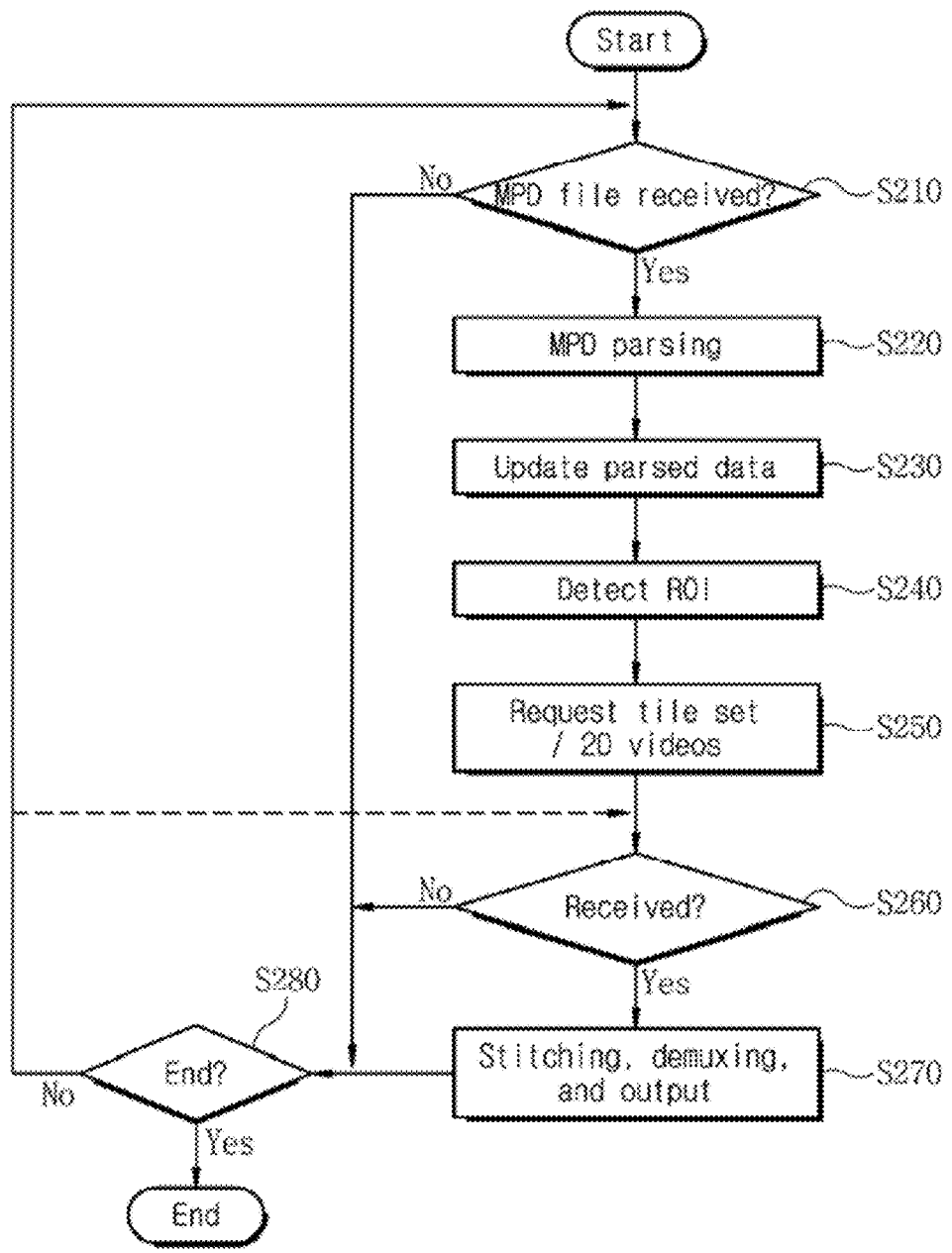
FIG. 8 is a flow diagram illustrating a tiled video multi-channel playback method according to an embodiment of the present invention.

FIG. 8 is a flow diagram illustrating a tiled video multi-channel playback method according to an embodiment of the present invention.

Referring to FIGS. 1 and 8, the tiled video multi-channel playback method may enable a simultaneous playback of a high-quality 360-degree VR video and a plurality of 2D videos through two decoding modules. Thus, this method can provide a user with the high-quality 360-degree VR video and the plurality of 2D videos at the same time with a low delay or seamlessly.

At step S210, the electronic device 200 determines whether the MPD file is received. When the MPD file is received from the streaming server 100, the electronic device 200 performs step S220. When the MPD file is not received, the electronic device 200 performs step S280.

At step S220, the electronic device 200 parses the MPD file. Parsing the MPD file, the electronic device 200 analyzes data.

At step S230, the electronic device 200 updates the parsed data. That is, the electronic device 200 stores the analyzed data in a cache to perform a data update. At this time, the electronic device 200 may output the updated data.

At step S240, the electronic device 200 detects the ROI. When having a sensor for sensing a user's viewpoint, the electronic device 200 may detect a region corresponding to the user's viewpoint as the ROI When having no sensor, the electronic device 200 may distinguish a main object and a background object by using the parsed data, and detect a region of the main object as the ROI. The electronic device 200 transmits the detected ROI information to the streaming server 100.

At step S250, the electronic device 200 transmits a request signal for a tile set (e.g., the video tiles having the first resolution and corresponding to the ROI information and the full video having the second resolution) and the plurality of 2D videos to the streaming server 100. At this time, the electronic device 200 may further transmit a request signal for audio information.

At step S260, the electronic device 200 determines whether information corresponding to the request signal is received. When the corresponding information is received, the electronic device 200 performs step S270. When the corresponding information is not received, the electronic device 200 performs step S280, At step S270, the electronic device 200 performs stitching and demuxing (or demultiplexing) of the received tile set and 2D videos and outputs a resultant video. The electronic device 200 may further output audio information. That is, reflecting the ROI information, the electronic device 200 may simultaneously play back the 360-degree VR video and the plurality of 2D videos.

At step S280, the electronic device 200 determines whether to terminate a process.

Unless terminating the process, the electronic device 200 returns to step S210 or step S260 which has been just previously performed.

While the present invention has been particularly shown and described with reference to some embodiments thereof, it will be understood by those skilled in the art that various changes in form and details may be made therein without departing from the scope of the present invention as defined by the appended claims.

What is claimed is:

1. An electronic device for a tiled video multi-channel playback, comprising:
    a device communication unit configured to establish a communication channel with a streaming server; and
    a device controller configured to:
        detect a region of interest (ROI) of an image related to a media presentation description (MPD) file provided by the streaming server,
        transmit ROI information to the streaming server,
        receive tiles of a tiled video having a first resolution and corresponding to the ROI information, a full video having a second resolution lower than the first resolution, and a plurality of 2-dimesional (2D) videos from the streaming server,
        generate a 360-degree virtual reality (VR) video by synthesizing the video tiles and the full video, and
        control a simultaneous playback of the generated 360-degree VR video and the plurality of 2D videos.

2. The electronic device of claim 1, wherein the device controller is further configured to:
    distinguish a main object and a background object by using data parsed from the MPD file, and to detect a region of the main object as the ROI.

3. The electronic device of claim 1, further comprising:
    a sensor unit configured to sense a user's viewpoint looking at the MPD file,
    wherein the device controller is further configured to:
    detect, as the ROI, a region corresponding to the user's viewpoint sensed by the sensor unit.

4. The electronic device of claim 1, wherein the device controller is further configured to:
    control the simultaneous playback of the 360-degree VR video and the plurality of 2D videos by using two decoders.

5. The electronic device of claim 4, wherein the device controller is further configured to:
    control one of the MD decoders to decode the 360-degree VR video, and control the other decoder to decode the plurality of 2D videos and audio information.

6. The electronic device of claim 1, wherein the device controller is further configured to:
    perform rendering such that the 360-degree VR video is disposed in an entire screen and the plurality of 2D videos are disposed in non-ROIs of the 360-degree VR video.

7. The electronic device of claim 1, wherein the device controller is further configured to perform the rendering in a stereo format.

8. A method of a tiled video multi-channel playback, comprising:

at an electronic device, receiving a media presentation description (MPD) file from a streaming server;

at the electronic device, detecting a region of interest (ROI) of an image related to the MPD file;

at the electronic device, transmitting ROI information to the streaming server;

at the electronic device, receiving tiles of a tiled video having a first resolution and corresponding, to the ROI information, a full video having a second resolution lower than the first resolution, and a plurality of 2D videos from the streaming server;

at the electronic device, generating a 360-degree VR video by synthesizing the video tiles and the full video; and at the electronic device, performing a simultaneous playback of the generated 360-degree VR video and the plurality of 2D videos.

9. The method of claim 8, wherein the simultaneous playback of the 360-degree VR video and the plurality of 2D videos is performed by using two decoders.

10. The method of claim 8, wherein the simultaneous playback includes rendering performed such that the 360-degree VR video is disposed in an entire screen and the plurality of 2D videos are disposed in non-ROIs of the 360-degree VR video.

* * * * *